(12) United States Patent
Brodeur et al.

(10) Patent No.: US 8,895,877 B2
(45) Date of Patent: Nov. 25, 2014

(54) ELECTRICAL CONNECTOR BUSHING

(75) Inventors: Marc Brodeur, St Jean sur Richelieu (CA); Guy Duval, St Jean sur Richelieu (CA)

(73) Assignee: Thomas & Betts International, LLC., Wilmington, DE (US)

( * ) Notice: Subject to any disclaimer, the term of this patent is extended or adjusted under 35 U.S.C. 154(b) by 95 days.

(21) Appl. No.: 13/606,256

(22) Filed: Sep. 7, 2012

(65) Prior Publication Data

US 2013/0056262 A1    Mar. 7, 2013

Related U.S. Application Data

(60) Provisional application No. 61/532,014, filed on Sep. 7, 2011.

(51) Int. Cl.
*H02G 3/18* (2006.01)
*H02G 15/007* (2006.01)

(52) U.S. Cl.
CPC .................................. *H02G 15/007* (2013.01)
USPC ........... 174/653; 174/650; 174/652; 439/271; 439/278

(58) Field of Classification Search
USPC ........... 174/652–653, 650; 439/271, 278, 279
See application file for complete search history.

(56) References Cited

U.S. PATENT DOCUMENTS

| | | | |
|---|---|---|---|
| 3,197,829 A | | 8/1965 | Caveney et al. |
| 3,732,526 A | | 5/1973 | Punako |
| 4,000,875 A | | 1/1977 | Jemison et al. |
| 4,022,966 A | * | 5/1977 | Gajajiva .................. 174/653 |
| 4,030,741 A | * | 6/1977 | Fidrych .................. 285/149.1 |
| 4,216,930 A | | 8/1980 | Rossler, Jr. et al. |
| 4,262,409 A | | 4/1981 | Madej |
| 4,513,172 A | * | 4/1985 | Matsui .................. 174/655 |
| 4,549,755 A | * | 10/1985 | Kot et al. .................. 285/341 |
| 4,919,370 A | | 4/1990 | Martin et al. |
| 5,118,057 A | | 6/1992 | Martin et al. |
| 5,208,427 A | * | 5/1993 | Couto et al. .................. 174/653 |
| 5,374,017 A | | 12/1994 | Martin et al. |
| 5,621,191 A | * | 4/1997 | Norris et al. .................. 174/653 |
| 5,836,048 A | | 11/1998 | Rossman et al. |
| 5,920,035 A | * | 7/1999 | Haney et al. .................. 174/652 |
| 6,177,633 B1 | | 1/2001 | Gretz |
| 6,421,485 B2 | * | 7/2002 | Morris .................. 385/100 |
| 6,482,017 B1 | | 11/2002 | Van Doorn |
| 6,825,416 B2 | | 11/2004 | Okuhara |
| 7,306,469 B1 | | 12/2007 | Slautterback |
| 7,361,838 B2 | | 4/2008 | Kuo |
| 7,481,436 B2 | | 1/2009 | May et al. |
| 8,288,667 B2 | * | 10/2012 | Chiou .................. 174/652 |
| 2010/0220969 A1 | | 9/2010 | Utz et al. |
| 2013/0105215 A1 | * | 5/2013 | Morris et al. .................. 174/394 |

FOREIGN PATENT DOCUMENTS

| | | |
|---|---|---|
| CA | 999942 | 11/1976 |
| CA | 2530826 A1 | 6/2006 |
| CA | 2639914 A1 | 4/2009 |
| DE | 102007033634 A1 | 1/2009 |
| JP | 2005151671 A | 6/2005 |
| WO | 9945620 A1 | 9/1999 |

* cited by examiner

*Primary Examiner* — Dhirubhai R Patel
(74) *Attorney, Agent, or Firm* — Butler Snow LLP

(57) ABSTRACT

A new bushing for strain reducing electrical fittings is disclosed. The bushing increases the pull-out performance of the fitting by including a textured area where the bushing comes into contact with the cable. The textured area may be created by affixing solid particles to the bushing so that the friction between the bushing and cable is increased.

20 Claims, 2 Drawing Sheets

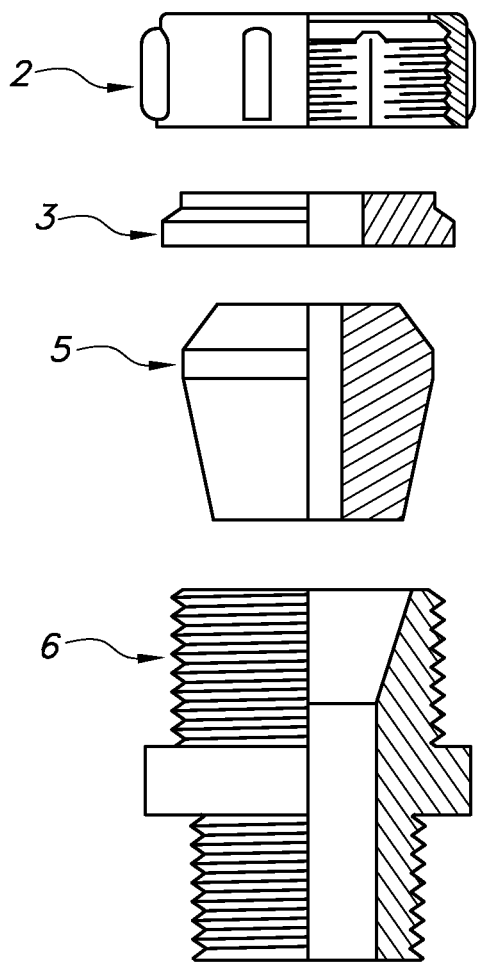
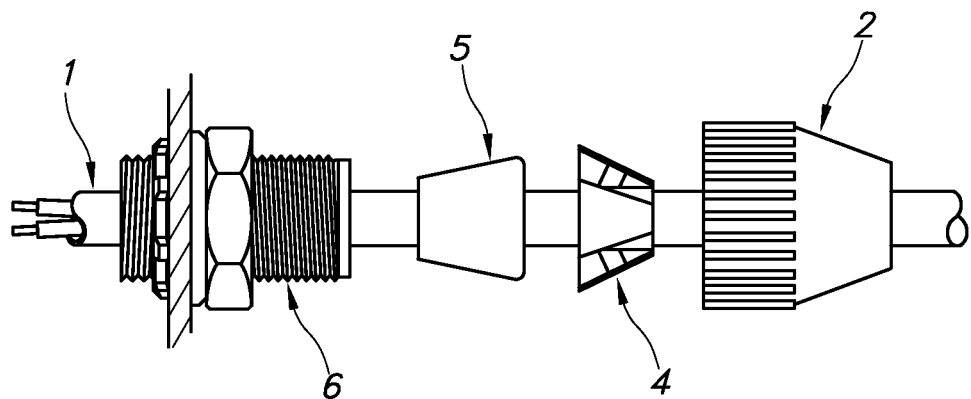
FIG. 2

ELECTRICAL CONNECTOR BUSHING

FIELD OF THE INVENTION

The present invention is generally directed toward an electrical bushing to be used in electrical cable fittings. More specifically, it is directed toward an electrical cable restraint device that uses solid particles to enhance its restraint capabilities.

BACKGROUND OF THE INVENTION

An electrical fitting is usually required at installations where a flexible electrical cable must pass through an opening in a hard surface, such as into an enclosure, through a bulkhead, or into a rigid conduit. The electrical fitting is intended to form a firm mechanical grip on the cable to prevent it from sliding in or out of the opening through which it passes. Typically, it also reduces strain on the cord and on any connections within the fixture.

Most strain relief electrical fittings on the market today consist of a threaded body, a deformable bushing, a slip ring, and a threaded gland. The deformable bushing compresses around the outer jacket of an electrical cable as the threaded body and threaded gland on either side of the deformable bushing are screwed together. As the bushing is compressed in an axial direction, its inner diameter decreases, causing the bushing to push inwardly on the electrical cable. If the electrical fitting is tightened sufficiently, the pressure of the bushing on the cable creates enough friction force to prevent the cable from sliding through the fitting. However, if the threaded gland is not tightened onto the threaded body sufficiently, the cable can be pulled loose, potentially causing an electrical short.

Other known bushings use extruded solid gripping teeth between the cable and the bushing to produce a more aggressive wedge action. However, the solid gripping teeth can cause damage to the protective outer jacket of the cable.

SUMMARY OF THE INVENTION

The presently disclosed invention is a bushing for an electrical fitting that increases the pull-out performance of the fitting, without requiring that greater torque be applied to the threaded gland as it is tightened around the threaded body. The pull-out performance of the electrical fitting is increased by including a textured area on the inner diameter surface of the bushing. The textured area increases the coefficient of friction of the bushing on the cable, thus requiring a greater force to pull it free from the electrical fitting.

A method for adding the textured area to the inner diameter surface of the bushing is also disclosed. These methods include affixing solid particles to the inner diameter surface by gluing, coating, or embedding them into the bushing, and adding a ribbed surface.

BRIEF DESCRIPTION OF THE DRAWINGS

Further advantages of the invention will become apparent by reference to the detailed description of preferred embodiments when considered in conjunction with the drawings:

FIG. 1 depicts a typical electrical fitting.
FIG. 2 illustrates another variation of an electrical fitting.

DETAILED DESCRIPTION

Figure 3:
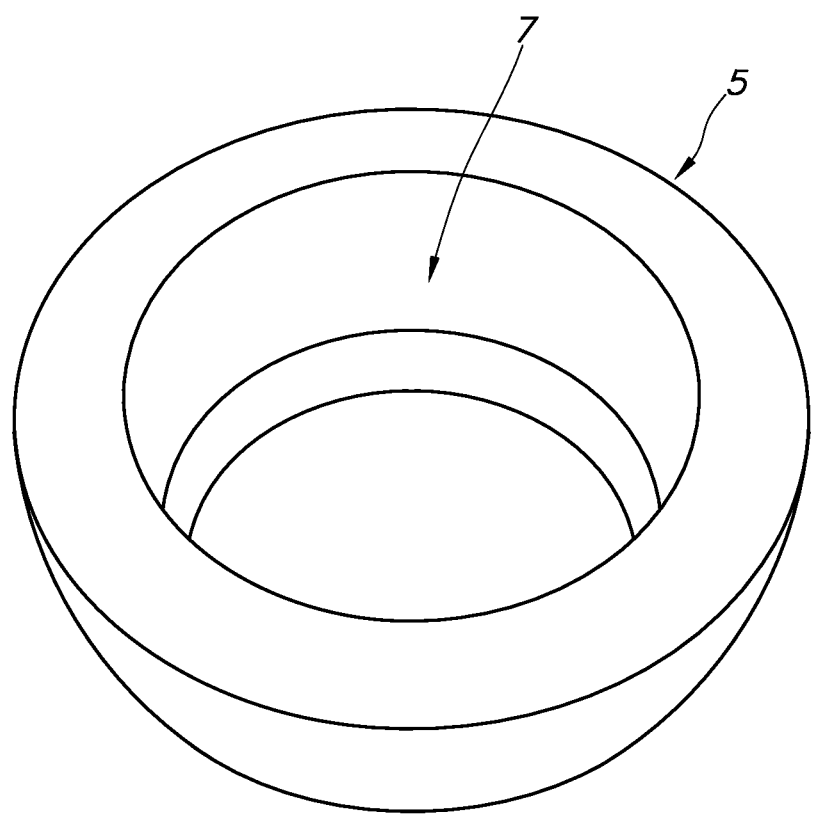
FIG. 3 depicts an embodiment of a bushing as claimed.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Referring now to FIG. 1 and FIG. 2, in a typical electrical fitting, threaded gland 2, which may include a slip ring 3 (or chuck 4, as shown in FIG. 2) is pushed over cable 1. Cable 1 is then passed through bushing 5 and finally through a threaded body 6. As threaded gland 2 is tightened around threaded body 6, threaded gland 2 pushes against slip ring 3 to apply pressure in an axial direction against bushing 5, causing it to deform and press against cable 1. The pull-out performance of the electrical fitting is dependent upon the force of the bushing 5 against the outer jacket of the cable 1.

As will be appreciated from FIG. 3, in the presently claimed invention, the inner surface of bushing 5 includes a textured area 7. The textured area 7 increases the coefficient of friction of the inner surface of the bushing. As a result, bushing 5 does not require as much force to prevent cable 1 from moving compared to prior art bushings. The lower force of bushing 5 will also reduce the torque required on threaded gland 2 as it is tightened onto threaded body 6. Most importantly, the pull-out performance, which is the ability of the electrical fitting to resist forces pulling the cable from the fitting, is increased.

The textured area 7 can be created using several methods. In one method, solid particles are affixed to the inner surface of the bushing 5. FIG. 3 depicts a bushing 5 with a band of solid particles affixed to the inner surface of the bushing 5 to create the textured area 7. The solid particles can either be added after the bushing is made, or can be incorporated during the manufacturing process of the bushing.

In one embodiment, solid particles are held in place with glue. The solid particles may be made of any hard particle, such as sand, hard rubber, crushed nut shells or plastic. The important characteristic of the solid particles is that the solid particles provide an increased coefficient of friction of the inner surface compared to other surfaces of the bushing that have not been coated with solid particles.

Other means of holding the solid particles could be used, such as a textured surface, a ribbed surface, a sandpaper-like insert which is adhered to the inside of the bushing 5. In one embodiment, the inner surface could be coated with a paint or other adhesive containing the solid particles. In another embodiment, the inner surface of the bushing 5 is impregnated with solid particles during manufacturing and is then allowed to harden.

In yet another embodiment, the textured area 7 is created by scoring or scratching the inner diameter surface, causing it to become rough and thus creating a greater coefficient of friction. The textured area 7 can also be a ribbed texture that is created during manufacturing of the bushing.

It is also contemplated that the textured area 7 of the inner surface of the bushing 5 may be any shape, such as stripes running axially through or obliquely across the inner surface. Additionally, the textured surface could cover the entire inner surface of the bushing 5, or just part of the inner surface.

The size, shape and nature of the solid particles could vary greatly. For example, sand or even plastic can be glued onto the inner surface of bushing 5 to create the textured area 7.

It is contemplated that the bushing 5 would be sold as part of a kit that includes a threaded body 6, threaded gland 2 and any chuck 4 or slip ring 3 required to secure the threaded gland 2 against the bushing 5.

It should be appreciated that the disclosed electrical fittings, including bushing 5 with the textured area 7 on the inner diameter surface, can simply be used, like existing bushings familiar to electricians. However, the torque applied to the threaded gland 2 that required to ensure that the cable will not pull out from the fitting is less than traditional bushings because of the increased friction between bushing 5 and cable 1.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

We claim:

1. A device for use in prevention of axial movement of a cable comprising:
   a. a deformable bushing having an inner diameter surface, wherein said inner diameter surface constricts around said cable when compressed in an axial direction, and an outer surface, wherein said outer surface does not come into contact with said cable; and
   b. a textured area on said inner diameter surface, wherein said textured area has an increased coefficient of friction relative to said outer surface.

2. The device of claim 1 wherein said textured area comprises a portion of said inner diameter surface.

3. The device of claim 2 wherein said textured area is in the shape of a band that circumscribes said cable.

4. The device of claim 2 wherein said textured surface is a coaxial stripe.

5. The device of claim 1 wherein said textured area is further comprised of solid particles affixed to said inner diameter surface.

6. The device of claim 5 wherein said solid particles are affixed to said inner diameter surface by gluing.

7. The device of claim 5 wherein said solid particles are painted onto said inner diameter surface.

8. The device of claim 5 wherein said solid particles are embedded in said inner diameter surface.

9. The device of claim 1 wherein said textured surface is made by scoring said inner diameter surface.

10. The device of claim 1 wherein said textured surface is a raised ribbed surface.

11. The device of claim 1 wherein said solid particles are affixed to an insert, said insert capable of being inserted between said cable and said deformable bushing.

12. A method for increasing the pull-out performance of an electrical fitting comprising:
    a. providing said electrical fitting comprising a deformable bushing having an inner diameter surface, wherein said inner diameter surface constricts around a cable when compressed in an axial direction, and an outer surface, wherein said outer surface does not come into contact with said cable; and
    b. creating a textured area on said inner diameter surface of said deformable bushing of said electrical fitting, wherein said textured area has an increased coefficient of friction relative to said outer surface.

13. The method of claim 12 wherein said textured area is created by affixing solid particles to said inner diameter surface.

14. The method of claim 13 wherein said textured area is created by gluing said solid particles to said inner diameter surface.

15. The method of claim 13 wherein said textured area is created by coating said inner diameter surface with a paint containing solid particles.

16. The method of claim 13 wherein said solid particles are embedded within said inner diameter surface.

17. The method of claim 12 wherein said textured area is created by rough spots on said inner diameter surface.

18. The method of claim 17 wherein said textured area is a ribbed surface.

19. An electrical fitting comprising:
    a. a threaded body;
    b. a threaded gland, capable of being screwed onto said threaded body; and
    c. a deformable bushing between said threaded body and said threaded gland; said deformable bushing having an inner diameter surface, wherein said inner diameter surface constricts around said cable when said threaded gland is screwed onto said threaded body, and an outer surface, wherein said outer surface does not come into contact with said cable; and d. a textured area on said inner diameter surface, wherein said textured area has an increased coefficient of friction relative to said outer surface.

20. The device of claim 19 wherein said textured area further comprises solid particles lining a portion of said inner diameter surface.

* * * * *